United States Patent [19]

Schmidt

[11] 4,308,630
[45] Jan. 5, 1982

[54] DEBURRING APPARATUS

[76] Inventor: Rainer Schmidt, Rosmart 30, 5990 Altena 4, Fed. Rep. of Germany

[21] Appl. No.: 142,191

[22] Filed: Apr. 21, 1980

Related U.S. Application Data

[63] Continuation-in-part of Ser. No. 910,702, May 30, 1978, Pat. No. 4,216,060.

[30] Foreign Application Priority Data

Apr. 19, 1979 [DE] Fed. Rep. of Germany ... 7911358[U]

[51] Int. Cl.³ .............................................. A46B 13/02
[52] U.S. Cl. ................................. 15/21 D; 15/104.03; 15/268; 51/98 R; 51/274
[58] Field of Search ...................... 15/21 D, 88, 104.03, 15/268; 51/98 R, 98.5, 125, 125.5, 216 R, 216 A, 219 R, 238 R, 272, 274

[56] References Cited

U.S. PATENT DOCUMENTS

| 2,588,758 | 3/1952 | Pilj .......................................... 15/88 |
| 2,619,663 | 12/1952 | Johnson et al. ......................... 15/88 |
| 2,814,913 | 12/1957 | DeWitt ............................. 51/98 R X |
| 2,893,027 | 7/1959 | Cresswell .......................... 15/21 D |

Primary Examiner—Edward L. Roberts
Attorney, Agent, or Firm—Allison C. Collard; Thomas M. Galgano

[57] ABSTRACT

A protective device is provided for a front face deburring of workpieces or profiles, particularly pipes, in a deburring machine having a rotating tool, e.g., a brush or a grinding wheel, or the like, which acts on the workpiece. The device includes an adjustable retaining means mountable on a workpiece retainer means in front of the rotating operating tool for receiving an upstanding interchangeable protective guard and guide plate having an opening for the workpiece.

8 Claims, 3 Drawing Figures

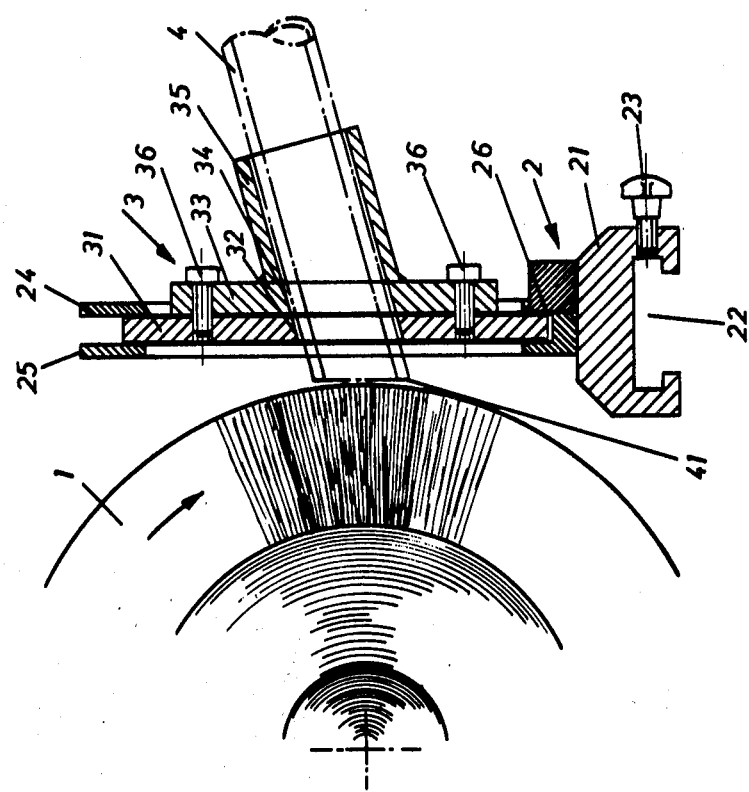
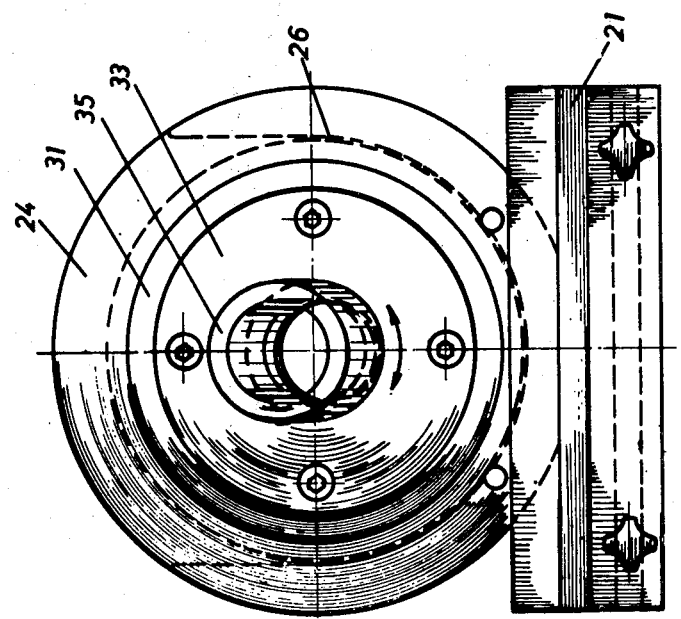

DEBURRING APPARATUS

This is a continuation-in-part application of U.S. application Ser. No. 910,702 filed on May 30, 1978 which has matured into U.S. Pat. No. 4,216,060.

The present invention relates to a protective guard and guide device for deburring the front faces or ends of workpieces and, in particular, pipes. More particularly, it relates to such a device which is especially suitable for use in a machine for deburring as disclosed in the aforementioned U.S. Pat. No. 4,216,060.

In this machine the rotating tool, e.g., a brush or a grinding wheel, extends partially from the machine housing. A workpiece holder is adjustable with respect to the rotating tool in a heightwise direction. When processing the workpieces during the deburring operation in such a machine, the danger exists that separated particles may injure the operator. For this reason, it has been previously known to provide a disk or a corresponding sheet metal cover above the rotating operating tool. However, even with such a protective cover, separated particles may be thrown out laterally which may still cause injuries to the operator of the machine. Furthermore, the danger also exists in machines of this type that the operator may touch the sides of the rotating tool or accidentally touch the front face or edge of the tool. The machine in accordance with applicant's afore-mentioned prior U.S. patent is however provided with protective covers on both sides thereof, which prevent an accidental touching by the operator.

It is therefore an object of the invention to provide a protective cover for such machines wherein the front face or edge of the operating tool is covered by means of a support or guide for the workpieces which are to be deburred at the front face of the tool.

This object is achieved according to the invention by the provision of a workpiece holder adapted to receive and accept an interchangeable upstanding guide and protective guard plate having an opening for the workpiece to be processed which is especially suitable for use in the machine disclosed in applicant's aforementioned prior U.S. patent.

In accordance with a preferred embodiment of the invention, a positive plate retainer means or plate holder is supported on the workpiece holder together with a locking device. The plate holder consists of two, spaced-apart, upstanding clamping plates mounted on a base, each of which has a central aperture and between which the guide and guard plate is retained; the same being inserted therebetween from above.

These two clamping plates may be supported on the base by means of two resilient ribs disposed therebetween which are partly slotted in a vertical direction. The plates are therefore displaceable towards each other and may be locked in clamping position by means of clamping or gripping screws.

The workpiece to be processed is fed through the interchangeable protective guard and guide plate against the rotating operating tool; the workpiece may be, e.g., a profiled bar or a pipe. The aperture in the guide plate is suitably configured and dimensioned so as to correspond to the outer dimensions of the workpiece, thereby preventing the operator from inadvertently inserting his hands through the aperture. It is of special importance that the protective guard and guide plate may be easily exchanged and that the total plate retainer device can be quickly attached on the machine.

In order to be able to deburr profiled workpieces which are asymmetrical or which have a bevel at their front faces, the invention provides a workpiece guide in the form of a single or double plate having a central bore which complements and accommodates the outer contour or shape of the workpiece. This guide plate is displaceably mounted in a corresponding recess on the workpiece holder and is rotatable about a horizontal axis which is perpendicular with respect to the axis of the work tool or brush.

Of particular importance and in a particularly preferred embodiment of the invention, the workpiece guide is provided with a guide bore having an axis which is positioned obliquely with respect to its rotating axis, for receiving and feeding a profiled workpiece therethrough. Most desirably, an oblique socket is provided on the workpiece guide, so as to lengthen this bore. For example, a pipe profile which has a bevelled cut front face may be guided to the rotating operating tool by turning the guide plate so that the front face of the pipe profile can be evenly deburred. The oblique positioning of the workpiece is also favorable when deburring profiled workpieces which are asymmetrical in their cross section and in profiled workpieces which have a large cross section with respect to the deburring tool.

These and other related objects and features of the present invention will become apparent from the following detailed description, considered in connection with the accompanying drawings, which disclose several embodiments of the invention. It is to be understood, however, that the drawings are designed for the purpose of illustration only, and not as a definition of the limits of the invention.

In the drawings, wherein similar reference characters denote similar elements throughout the several views:

FIG. 1 is a transverse sectional view of a protective guard and guide device disposed in front of a rotating brush and having an oblique guide for the pipe profile to be deburred;

FIG. 2 is a front elevational view of the device shown in FIG. 1; and

Figure 3:
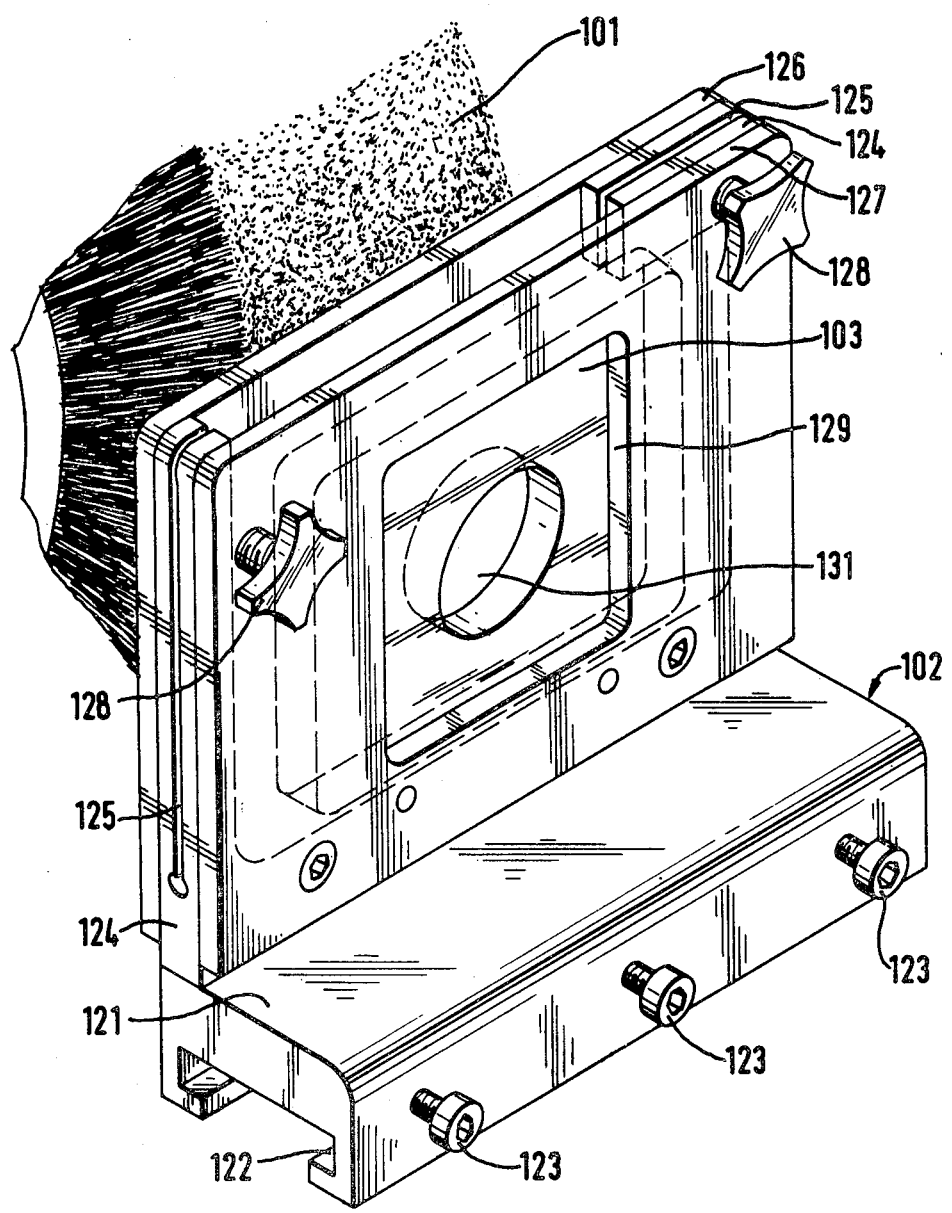
FIG. 3 is a perspective view of another protective guard and guide device disposed in front of a rotating brush.

Referring now in particular to FIGS. 1 and 2, a plate retaining means or plate holder 2 is provided for a workpiece guide 3 which is disposed in front of a rotating brush 1 of a deburring apparatus or machine (not shown); for more complete details concerning the construction of the deburring machine, reference may be had to applicant's U.S. Pat. No. 4,216,060 the subject matter of which is incorporated herein by reference thereto. Plate holder 2 is positively clamped on a workpiece holder (not shown) by means of a dovetailed groove 22 formed on the lower side of its base 21; positive securement being effected with clamping screws 23. Plate holder 2 consists of two, spaced-apart upstanding annular-like guide plates 24 and 25 which are positioned transversely with respect to brush 1 and are retained in base 21. Workpiece guide 3 is received between these two plates 24 and 25. The workpiece guide essentially consists of a circular, disc-shaped single or double plate. In the illustrated embodiment, two circular-shaped plates 31 and 33 of different outer diameters are retained against each other. Plate 31 is supported in a support shoulder 26 of guide plate 25 and is rotatable around a horizontal axis. Plates 31 and 33 are provided with guide bores 32 and 34, respectively, for receiving a workpiece, i.e., a pipe 4 shown in dotted lines. For deburring pipe profiles 4 having a bevelled cut, the bore axes of guide bores 32 and 34 are positioned obliquely with respect to the rotating axis of guide plates 24 and 25.

As can be seen in FIG. 1, the bevelled front face of pipe 4 is directed against brush 1. An oblique tubular socket 35 is mounted on outer plate 33 so as to facilitate the guiding of the pipe and permit a turning of the plates 31 about a horizontal axis on support shoulder 26; this also effecting rotation of plate 32 since the plates are held against each other by means of screws 36. Thereby, the edges of the front face 41 of pipe 4 may be evenly deburred.

For processing differently profiled pipes having blunt or obliquely cut front faces, the workpiece guides can be easily interchanged on plate holder 2.

Another embodiment having a fixed protective guard and guiding plate 103 is shown in FIG. 3. The plate retaining means or holder 102 is again mounted in front of a rotating brush 101 of a deburring machine (not shown). Plate holder 102 is positively locked on the workpiece retaining means or holder (not shown) of the machine by means of its associated base 121 and groove 122 positioned on the lower side thereof, and is fixedly retained thereon by means of clamping screws 123.

Extending substantially vertically upwardly from base 121 are two spaced-apart clamping plates 126 and 127 each having a central aperture 129, which can be displaced towards and away from one another. A guide and protective guard plate 103 is inserted from above between these two plates and is fixedly clamped therebetween. Clamping plates 126 and 127 are supported by two vertically partially-slotted resilient ribs or rib bars 124 which are mounted on base 121; the partial slot thereof being designated by reference numeral 125. Two gripping screws 128 are employed to pull the two plates 126 and 127 toward each other, thereby positively clamping the inserted guide and guard plate 103 therebetween. As can be readily seen, the protective guard and guide plate 103 can be transversely displaced after loosening gripping screws 128, for the purpose of an even wear and tear on brush 101 over its total width.

The workpiece to be deburred in guided through bore 131 in plate 103 and against brush 101. This bore in the interchangeable plates 103 is always designed to complement and accommodate the shape and dimension of the workpiece to be deburred so that the operator cannot pass his fingers or hand between the workpiece and the wall of the aperture.

While several embodiments of the invention have been shown and described, it will be obvious that many modifications and changes may be made thereunto, without departing from the spirit and scope of the invention.

What is claimed is:

1. A protective guard and guide device for deburring the front faces of a workpiece in a deburring apparatus of the type having a rotating deburring tool and a workpiece holder disposed in front of the rotating tool, comprising:

adjustable plate retaining means mountable on said workpiece holder including an interchangeable generally upstanding protective guard and guide plate having an aperture through which the workpiece may be inserted, said plate retaining means also including a locking device for positively locking the same on said workpiece holder and a generally horizontally-extending base and two spaced-apart, generally vertically upstanding clamping plates having central apertures mounted on said base between which said protective guard and guide plate is inserted and releasably clamped therebetween.

2. The device according to claim 1, wherein said clamping plates are displaceable towards each other and are retained on two resilient, vertically partially-slotted ribs which are mounted on said base.

3. The device according to claim 1, wherein said clamping plates are displaceable towards each other by means of gripping screws.

4. A protective guard and guide device for deburring the front faces of a workpiece in a deburring apparatus of the type having a rotating deburring tool and a workpiece holder disposed in front of the rotating tool, comprising:

adjustable plate retaining means mountable on said workpiece holder including an interchangeable generally upstanding protective guard and guide plate having an aperture through which the workpiece may be inserted, said plate retaining means including a support recess, said aperture being generally centrally-disposed and configured and dimensioned to complement the outer shape of the workpiece to be deburred, and said guard and guide plate being rotatably mounted in said support recess.

5. The device according to claim 4 wherein said plate is composed of two plates coupled together.

6. The device according to claim 4, wherein said plate retaining means includes two spaced-apart annular support plates for supporting said guard and guide plate which is annular in shape and wherein one of said support plates which directly faces the operating tool has a support shoulder which defines said support recess and which corresponds to the outer diameter of said annular guard and guide plate.

7. The device according to claim 4, wherein said guard and guide plate aperture has an axis which is positioned obliquely with respect to the rotatable axis of said plate.

8. The device according to claim 7, wherein an oblique tubular socket is secured to said plate in alignment with said aperture thereof so as to extend the length thereof.

* * * * *